(12) United States Patent
Joyner et al.

(10) Patent No.: US 7,778,788 B2
(45) Date of Patent: Aug. 17, 2010

(54) SCANNER BASED OPTICAL INSPECTION SYSTEM

(75) Inventors: Randall W. Joyner, Union, CT (US); Jesse R. Boyer, Berlin, CT (US)

(73) Assignee: United Technologies Corporation, Hartford, CT (US)

( * ) Notice: Subject to any disclaimer, the term of this patent is extended or adjusted under 35 U.S.C. 154(b) by 84 days.

(21) Appl. No.: 12/156,083

(22) Filed: May 29, 2008

(65) Prior Publication Data
US 2009/0299690 A1    Dec. 3, 2009

(51) Int. Cl.
*G01C 25/00* (2006.01)
(52) U.S. Cl. ...................................... 702/97
(58) Field of Classification Search ............ 702/97
See application file for complete search history.

(56) References Cited
U.S. PATENT DOCUMENTS
2005/0100204 A1* 5/2005 Afzal et al. ............... 382/135
2006/0188143 A1* 8/2006 Strassenburg-Kleciak ... 382/154
2007/0122022 A1* 5/2007 Shimizu et al. ............ 382/135

* cited by examiner

Primary Examiner—Aditya Bhat
(74) Attorney, Agent, or Firm—Kinney & Lange, P.A.

(57) ABSTRACT

A method for measuring dimensions between selected points on a side of interest in objects selected for measurement by an optical measuring system comprising a flatbed scanner and a connected computer system through acquiring a reference image to provide corresponding image distance errors; and also acquiring a measurement object image. Deviation curves are provided as the basis for determining deviation errors in the measurement object image. Corrected measurement object image distances are formed through combining the deviation errors in the measurement object image distances with the corresponding measurement object image. These corrected measurement object image distances are used to determine distances between chosen pairs of those selected locations.

21 Claims, 4 Drawing Sheets

SCANNER BASED OPTICAL INSPECTION SYSTEM

BACKGROUND

The present invention relates to optically determining separation magnitudes of features in objects and, more particularly, of such features at or adjacent to flatter sides of those objects.

Accurately measuring separations between features in an object, even over relatively flat surfaces therein, can be difficult—especially those objects with complicated geometries or small dimensional differences or both. Optical methods have been used to do so, and these methods offer what is often a further advantage in that contact with the features of interest being measured can many times be avoided.

However, the optical devices for doing so are often expensive or cumbersome to use, or both. Optical comparators, fixtures for providing traces of objects on light tables, and three dimensional measuring machines are examples. Thus, there is a desire for a less costly, easily used, optically based measuring device for measuring separations between features of interest in flatter objects.

SUMMARY

The present invention provides a method for measuring dimensions between selected points on a side of interest in objects selected for measurement by an optical measuring system comprising a flatbed scanner and a connected computer system. The method includes acquiring a reference image with the scanner of an optical coordinates reference object having a reference coordinate and field coordinates distributed over a field area thereof relative to the reference coordinate, determining reference image coordinate distances for field coordinate images, and determining differences between reference actual distances in the optical coordinates reference object and corresponding reference image distances for corresponding images of those field coordinates to provide corresponding image distance errors; and also acquiring a measurement object image with the scanner of a side of a measurement object followed by determining measurement object image distances for selected locations in the measurement image. Deviation curves are provided through fitting a curve to image distance errors over corresponding reference image coordinate distances to provide each as a function of length from a reference coordinate as the basis for determining deviation errors in the measurement object image distances for the selected locations in the measurement image using those measurement object image distances to select a corresponding deviation error from a corresponding deviation curve. Corrected measurement object image distances are formed through combining the deviation errors in the measurement object image distances with the corresponding measurement object image. These corrected measurement object image distances are used to determine distances between chosen pairs of those selected locations.

DETAILED DESCRIPTION

Figure 1A:
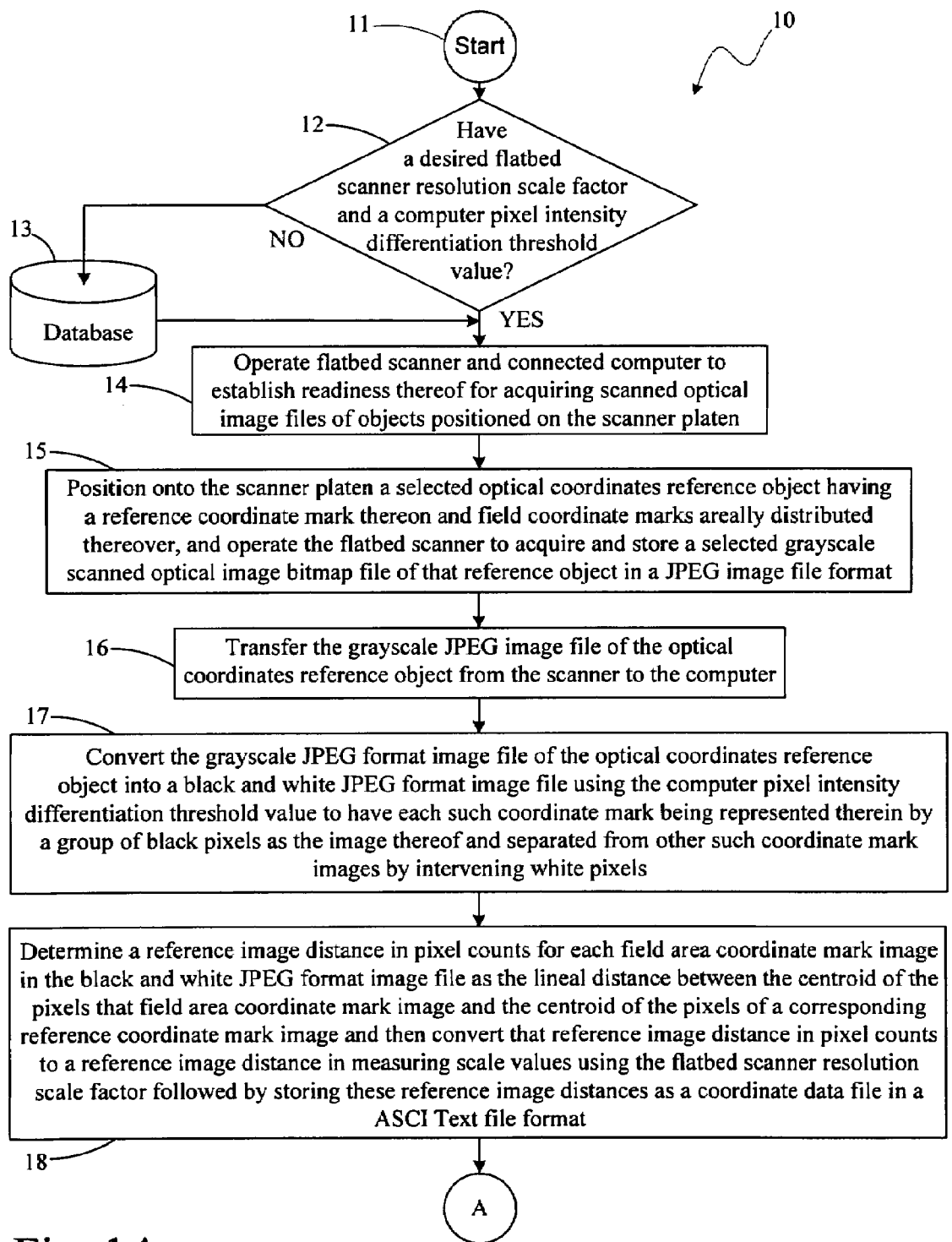
FIGS. 1A and 1B together show a flow chart embodying therein at least a portion of the present invention.

The present invention uses for measuring selected dimensions of flatter objects a flatbed optical image scanner of the kind typically used with computers or computer networks in business or home offices. Such a scanner is used to acquire a representation of an object on the scanner glass bed or platen, such as a page with graphics, printed text or handwritten text or sketching thereon, that is converted by the scanner into a digital numbers representation thereof stored in an electronics based memory therein. The conversion is usually effected through the scanner providing an image of the object on a charge-coupled device therein from which a corresponding sequence of digital numbers representing the resulting optical intensities occurring in the image on that device is obtained and stored. Such scanners have become relatively inexpensive to purchase while still providing relatively high resolution of the image of the object, i.e. providing large numbers of picture elements, or pixels, per unit area of that object in the digital numbers representation formed thereof by the scanner.

The object selected dimensions measurement process involves the use of such a scanner along with a suitable computer system that can direct operation of that scanner, and acquire and analyze the digital numbers representations provided by the scanner of the object selected for such measurement. A methodology for doing so is presented in a general example involving a general measurement object that as is set forth in the figures. The method begins by determining the errors that occur in separation distances found by the scanner as shown in a flow chart, 10, beginning in FIGS. 1A and 1B and at a start balloon, 11, in FIG. 1A. Thus, a suitable computer system first determines in a decision diamond, 12, whether it has the desired value for the flatbed scanner resolution scale factor and a selected computer pixel intensity differentiation threshold value, or whether that data must be first acquired from a database, 13. The former allows conversion from lineal pixel counts to an equivalent lineal conventional measure of distance, and the latter sets the determination basis for finding a pixel to be either white or black. Thereafter, the computer system begins operating the flatbed scanner to ready it for acquiring digital numbers representations of objects placed on the glass bed or platen of that scanner in a performance block, 14.

The optical measuring of dimensions of flatter objects placed on the glass bed or platen of the scanner is based on the computer system first obtaining a digital numbers representation formed by the scanner for the image of a suitable optical coordinates reference object placed on the scanner glass bed. The positions found by the scanner for the known accurately positioned optical coordinates on the reference object can be used to determine the errors introduced by the scanner in acquiring digital numbers representations of the images of other objects of interest in their being measured by subsequently being placed on the glass bed of that scanner for such measurements. These coordinate indicia include a reference coordinate and field coordinates distributed over a field, or calibration, area of the reference object relative to the reference coordinate to provide that area with a plurality of distributed coordinate markers located at various distances with respect to the reference coordinate. These coordinate markers can be provided at locations in this area that are convenient for the coordinate system chosen for locating selected positions in the area, e.g. a two dimensional Cartesian coordinate system or a two dimensional polar coordinate system. Such optical reference objects having optically imageable, and relatively accurately positioned, coordinate indicia provided therein and can alternatively include objects ranging in the structural arrangement for maintaining accuracy from a calibrated mylar radius chart of the kind used with shadowgraphs to a calibrated dot pattern optical glass plate.

Such an optical coordinates reference object is used to this end in the next performance block, 15, through its being placed on the scanner platen with the calibration area thereof having the imageable coordinate indicia therein arranged to be available to the scanner for acquiring a corresponding digital numbers representations thereof. The scanner is then operated to acquire and store a grayscale optical image numbers representation file, or bitmap file, in a JPEG image file format of at least a portion of this calibration area with its imageable coordinate indicia. In a following performance block, 16, this grayscale JPEG image file of the optical coordinates reference object is transferred from the scanner to the computer system.

The grayscale JPEG format image file of the optical coordinates reference object is converted into a black and white JPEG format image file in another performance block, 17. This is accomplished through using the computer pixel intensity differentiation threshold value to have each pixel represented in a reformatted bitmap file as either a white pixel for those pixels that had a grayscale value at acquisition above this threshold value or a black pixel for those pixels having had a grayscale value below this threshold value. This results in each coordinate mark being represented therein by a group of black pixels as the image thereof and separated from each of the other such coordinate mark images by intervening white pixels.

Thereafter, in a subsequent performance block, 18, a reference image coordinate distance in pixel counts is determined for each field area coordinate mark image in the black and white JPEG format image file as the lineal distance between the centroid of the pixels of that field area coordinate mark image and the centroid of the pixels of a corresponding reference coordinate mark image (typically, the same single reference for all). Each reference image coordinate distance in pixel counts is then converted to a reference image coordinate distance in measuring scale values (metric or English units) using the flatbed scanner resolution scale factor followed by storing these reference image distances as a coordinate data file in a ASCII Text file format along with the flatbed scanner resolution scale factor used.

Figure 1B:
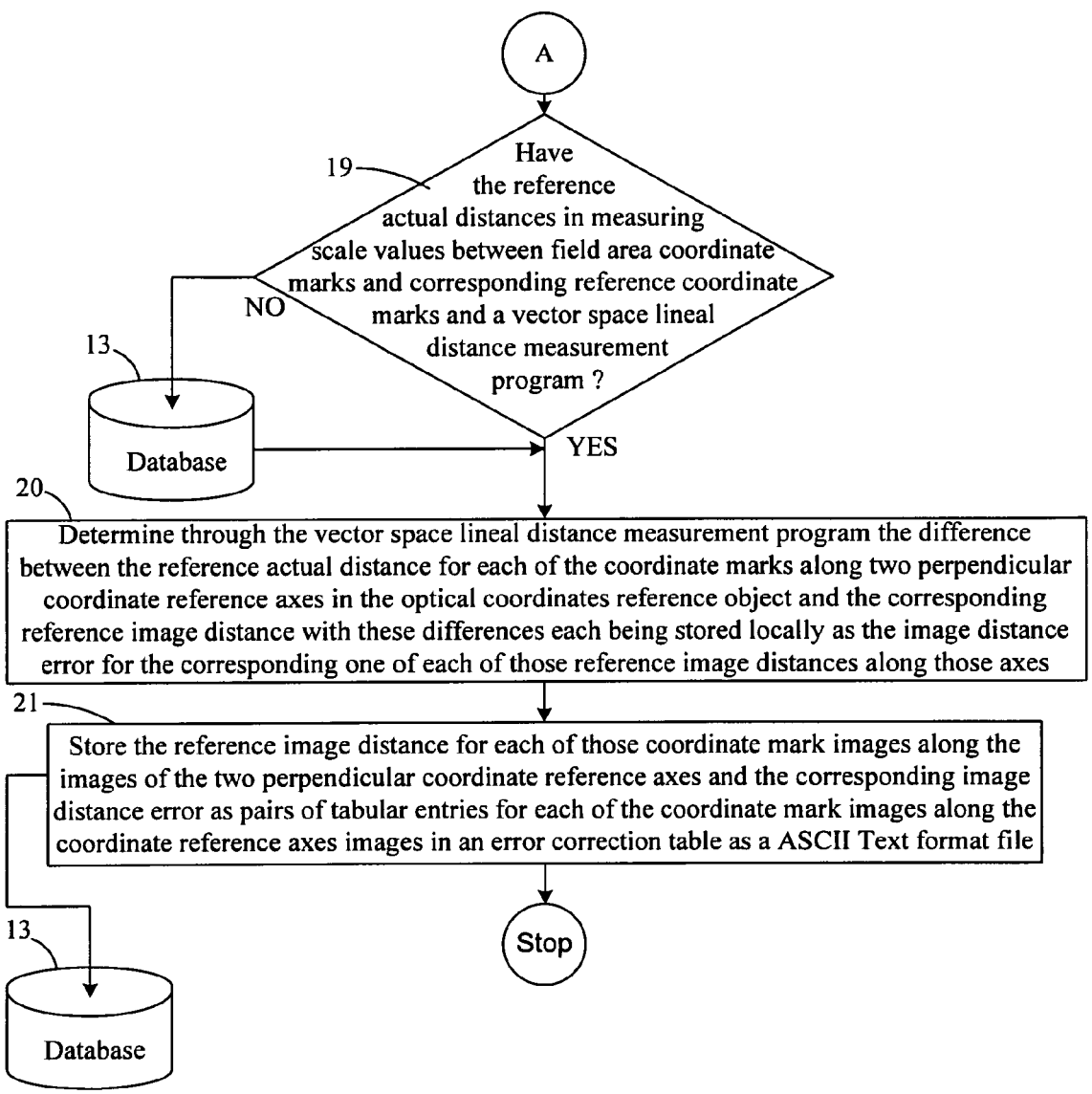

Whether immediately, or at some later more convenient time, the computer system then determines the errors in the reference image coordinate distances in measuring scale values between the field area coordinate marks and the corresponding reference coordinate mark based on distance representations in coordinate values in a two-dimensional vector space. To do so, the computer system next determines in a decision diamond, 19, in FIG. 1B whether it has the reference actual coordinate distances in measuring scale values occurring between the coordinate markers in the reference object, and also whether it has the vector space lineal distance determination computer program, or whether they must be first acquired from database 13. The transition path from FIG. 1A to FIG. 1B is indicated by a transition balloon, A, in each figure.

Thus, in a following performance block, 20, the vector space lineal distance representation program determines the difference between a) the components of the reference actual coordinate distances along two perpendicular coordinate reference axes in the optical coordinates reference object for each of the coordinate marks, and b) the corresponding components along those two perpendicular coordinate reference axes of the reference image coordinate distances found in block 18 for the same coordinate marks. Although a two dimensional Cartesian coordinate system is described here, the locating components along the coordinate axes referred to here could instead be locating components along the coordinate axes of a different coordinate system, e.g. along the angle and radius coordinates of a two dimensional polar coordinates system.

These differences are stored locally in the computer system for each coordinate marker as the image distance errors for the components of the corresponding reference image coordinate distance thereof along those axes. Then, in performance block, 21, the reference image coordinate distance for each of those coordinate mark images along the images of the two perpendicular coordinate reference axes, and the corresponding image distance error as pairs of tabular entries for each of the coordinate mark images along the coordinate reference axes images, are stored together in an error correction table in a ASCII Test format file.

Figure 2:
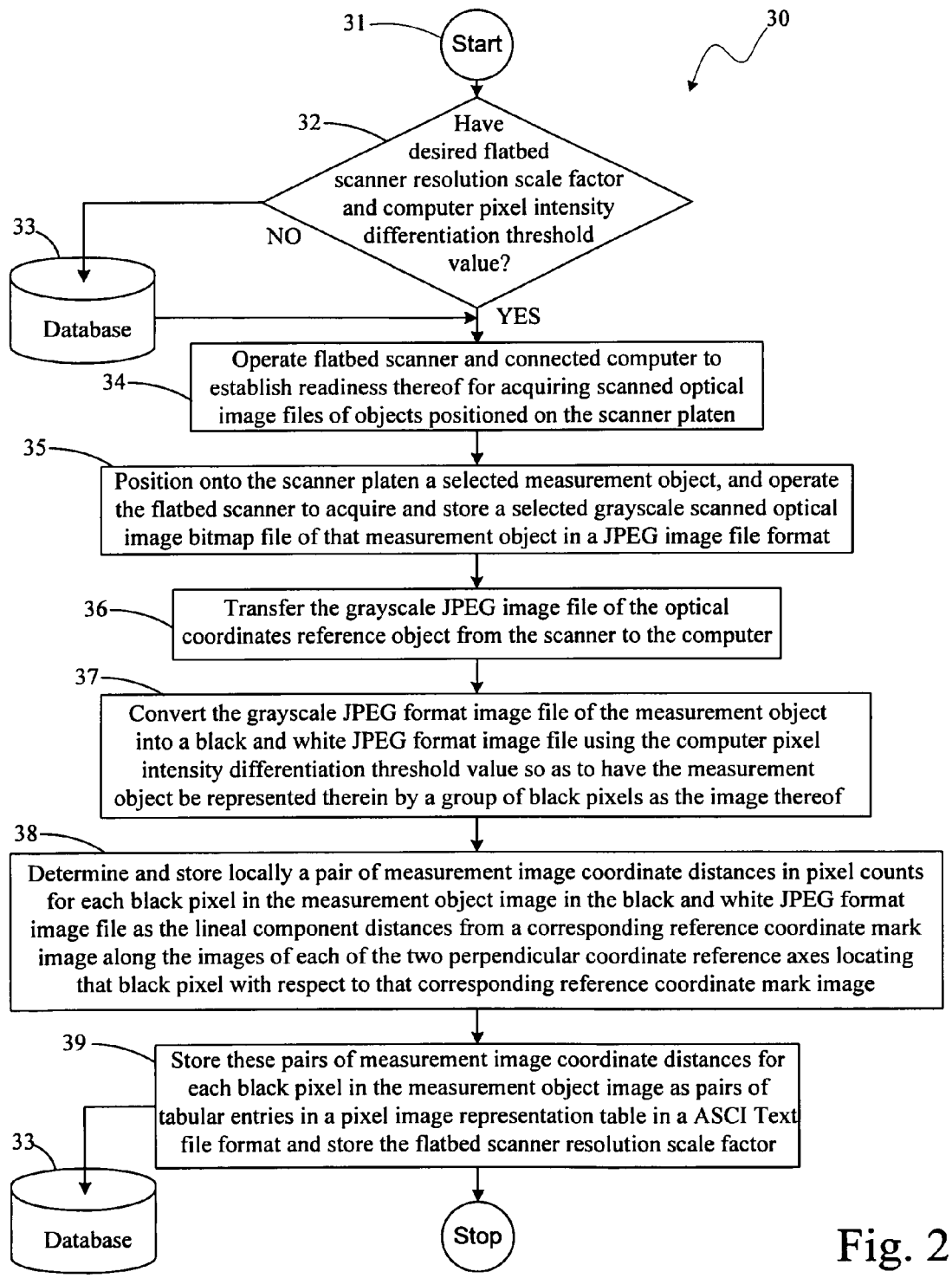
FIG. 2 shows a flow chart embodying, therein an example continuation of the flow chart of FIGS. 1A and 1B.

In FIG. 2, the subsequent process for acquiring a digital numbers representation from the scanner of an object selected for such measurement is indicated in a flow chart, 30, beginning at a start balloon, 31. The computer system first determines in a decision diamond, 32, whether it has the desired value for the flatbed scanner resolution scale factor and a selected computer pixel intensity differentiation threshold value, or whether that data must be first acquired from database 13. The former again allows conversion from lineal pixel counts to an equivalent lineal conventional measure of distance, and the latter again sets the determination basis for finding a pixel to be either white or black. Thereafter, the computer system begins operating the flatbed scanner to ready it for acquiring digital numbers representations of objects placed on the glass bed of that scanner in a performance block, 34.

In performance block, 35, an object selected for dimensional measurement is placed on the scanner platen with a relatively flat side thereof of interest being arranged to be available to the scanner for acquiring a corresponding digital numbers representations thereof. The scanner is then operated to acquire and store a grayscale optical image numbers representation file, or bitmap file, in a JPEG image file-format of at least a portion of this object of interest side. In a following performance block, 36, this grayscale JPEG image file of the measurement object is transferred from the scanner to the computer system.

The grayscale JPEG format image file of the side of the object of interest is converted into a black and white JPEG format image file in another performance block, 37. This is accomplished through using the computer pixel intensity differentiation threshold value to have each pixel represented in a reformatted bitmap file as either a white pixel for those pixels that had a grayscale value at acquisition above this threshold value or a black pixel for those pixels having had a grayscale value below this threshold value. This results in each coordinate mark being represented therein by a group of black pixels as the image thereof and separated from each of the other such coordinate mark images by intervening white pixels.

Thereafter, in a subsequent performance block, 38, a pair of measurement image component distances in pixel counts for each black pixel in the measurement object image in the black and white JPEG format image file are determined and stored locally as the lineal component distances along the images of each of the two perpendicular coordinate reference axes to a black pixel from a corresponding reference coordinate mark image. This pair of lineal component distances for each black pixel locates that black pixel with respect to that corresponding reference coordinate mark image. Then, these pairs of measurement image component distances for each black pixel in the measurement object image are stored in a performance block, 39, as pairs of tabular entries in a pixel image representation table in as ASCII Text file format, and stored therewith is the flatbed scanner resolution scale factor used.

Figure 3:
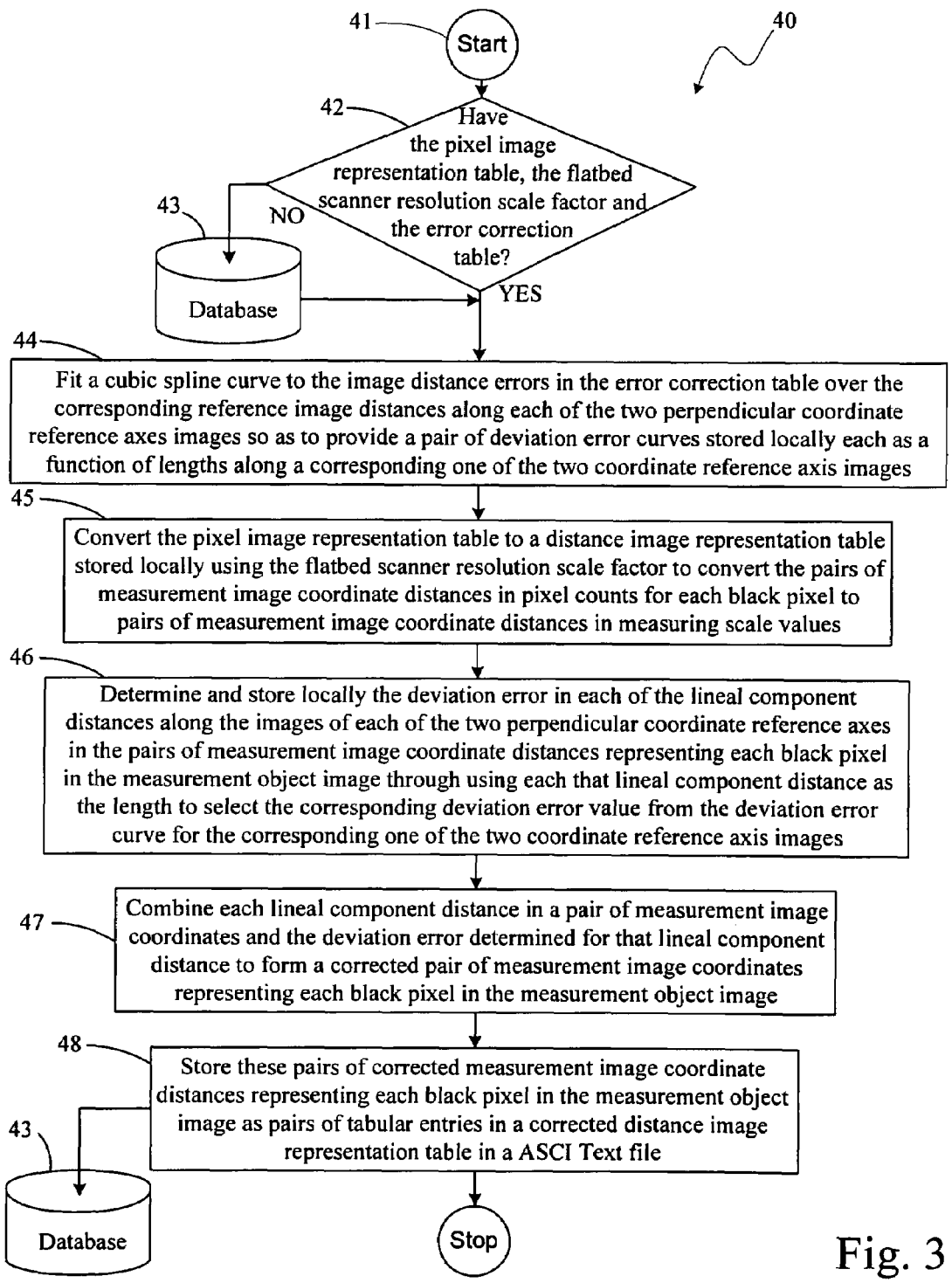
FIG. 3 shows a flow chart embodying therein an example continuation of the flowchart of FIGS. 1A, 1B and 2.

Thus, a raw data representation of the relatively flat side of interest of the object selected for dimensional measurement is acquired in the pixel image representation table therefor with this representation being provided for each pixel as pixel measurement image component distances pairs. For accurate measurement of dimensions along or across that side in the object from the optical image acquired thereof, this raw data must be corrected based on the error correction table obtained in block 21 which is undertaken in the process shown in a process indicated in a flow chart, 40, in FIG. 3 beginning at a start balloon, 41. The computer system first determines in a decision diamond, 42, whether it has the flatbed scanner resolution scale factor selected, the pixel image representation table and the error correction table, or whether that data must be first acquired from database 13.

The computer system then, in a following performance block, 44, fits a cubic spline curve to the image distance errors in the error correction table over the corresponding reference image distances along each of the two perpendicular coordinate reference axes images. This provides a pair of deviation error curves stored locally each as a function of lengths along a corresponding one of the two coordinate reference axis images.

Thereafter, the pixel image representation table is converted by the computer system, in a subsequent performance block, 45, to a distance image representation table stored locally. This is accomplished through using the flatbed scanner resolution scale factor to convert the pairs of measurement image component distances in pixel counts for each black pixel to pairs of measurement image component lineal distances in measuring scale values.

Then, in a next performance block, 46, the deviation error in each of the lineal component distances along the images of each of the two perpendicular coordinate reference axes in the pairs of measurement image component lineal component distances representing each black pixel in the measurement object image are determined and stored locally by the computer system. The computer system does this through using each of the lineal component distances for each black pixel as the length to select the corresponding deviation error value from the deviation error curve for the corresponding one of the two coordinate reference axis images. Each lineal component distance in a pair of measurement image coordinates and the deviation error determined for that lineal component distance are then combined in a further performance block, 47, to form a corrected pair of measurement image distance components representing each black pixel in the measurement object image.

These pairs of corrected measurement image component distances representing each black pixel in the measurement object image are stored in a final performance block, 48, as pairs of tabular entries in a corrected distance image representation table in an ASCII Text file. The magnitudes of distance separations between selected black pixels can then be found by the computer system from this corrected distance image representation table, and these magnitude values are the measures of the dimensions between corresponding locations on the side of interest of the object selected to be measured provided by the optical measuring system provided by the scanner and the computer system together.

Although the present invention has been described with reference to preferred embodiments, workers skilled in the art will recognize that changes may be made in form and detail without departing from the spirit and scope of the invention.

The invention claimed is:

1. A method for measuring dimensions between selected points on a side of interest in objects selected for measurement by an optical measuring system comprising a flatbed scanner and a connected computer system, the method comprising:
   acquiring a reference image with the scanner of an optical coordinates reference object having optically imageable coordinate indicia therein including a reference coordinate and field coordinates distributed over a field area thereof relative to the reference coordinate;
   determining reference image coordinate distances for field coordinate images relative to a corresponding reference coordinate image;
   determining differences between reference actual distances in the optical coordinates reference object for field coordinates relative to a corresponding reference coordinate and corresponding reference image distances for corresponding images of those field coordinates to provide corresponding image distance errors for the field coordinate images;
   acquiring a measurement object image with the scanner of a side of a measurement object;
   determining measurement object image distances for selected locations in the measurement image relative to a corresponding reference coordinate;
   fitting a curve to image distance errors over corresponding reference image coordinate distances so as to provide deviation curves each as a function of length from a reference coordinate;
   determining deviation errors in the measurement object image distances for the selected locations in the measurement image using those measurement object image distances to select a corresponding deviation error from a corresponding deviation curve;
   combining the deviation errors in the measurement object image distances for each of the selected locations in the measurement image with the corresponding measurement object image distances to form corresponding corrected measurement object image distances for each of the selected locations in the measurement image; and
   using the corrected measurement object image distances for each of the selected locations in the measurement image to determine distances between chosen pairs of those selected locations.

2. The method of claim 1 wherein acquiring a reference image with the scanner of an optical coordinates reference object includes obtaining a bitmap file in the computer system comprising an array of pixels each represented by a corresponding grayscale value, and determining reference image coordinate distances for field coordinate images relative to a corresponding reference coordinate image further comprises using a pixel intensity differentiation threshold to convert each pixel in the array to being either black or white value pixel depending on its grayscale value with respect to this threshold and with each reference image coordinate distance for field coordinate images relative to a corresponding reference coordinate image comprising the lineal distance between a centroid of the black pixels in a field coordinate image and a centroid of the black pixels in a reference coordinate image.

3. The method of claim 1 wherein determining differences between reference actual distances and corresponding reference image distances further comprises determining the difference between a) components of reference actual distances along two coordinate reference axes in the optical coordinates reference object in the coordinate system used to provide field coordinates and b) corresponding components of the reference image distances for the images of those field coordinates along images of those two coordinate reference axes in the reference image to thereby provide corresponding pairs of image distance errors for field coordinate images each along one of the two coordinate reference axes images.

4. The method of claim 3 wherein the coordinate system used has the two coordinate reference axes positioned perpendicular to one another.

5. The method of claim 1 wherein acquiring a measurement object image with the scanner of a side of a measurement object includes obtaining a bitmap file in the computer system comprising an array of pixels each represented by a corresponding grayscale value, and determining measurement object image distances for selected locations in the measurement image further comprises using a pixel intensity differentiation threshold to convert each pixel in the array to being either black or white value pixel depending on its grayscale value with respect to this threshold and with each measurement object image distance for selected locations in the measurement image relative to a corresponding reference coordinate comprising the lineal distance between the black pixel at that selected location in the measurement image relative to that corresponding reference coordinate.

6. The method of claim 5 wherein a measurement object image distance is determined for every black pixel in the measurement object image.

7. The method of claim 5 wherein determining measurement object image distances for selected locations in the measurement image further comprises determining components of the measurement object image distances along two coordinate reference axes of the coordinate system used in the reference image for selected locations in the measurement image relative to a corresponding reference coordinate.

8. The method of claim 7 wherein the coordinate system used has the two coordinate reference axes positioned perpendicular to one another.

9. The method of claim 7 wherein a measurement object image distance is determined for every black pixel in the measurement object image.

10. The method of claim 7 wherein fitting a curve to image distance errors over corresponding reference image coordinate distances further comprises fitting a curve to those members of the pairs of image distance errors over corresponding reference image coordinate distances that correspond one of the two coordinate reference axes in the reference image so as to provide deviation curves each as a function of length from a reference coordinate along a corresponding one of the two coordinate reference axes.

11. The method of claim 10 wherein the coordinate system used has the two coordinate reference axes positioned perpendicular to one another.

12. The method of claim 10 wherein fitting a curve to image distance errors over corresponding reference image coordinate distances is accomplished through use of cubic splines.

13. The method of claim 10 wherein determining deviation errors in the measurement object image distances for the selected locations in the measurement image further comprises determining the deviation error in each of the two components of the measurement object image distances along the two coordinate reference axes in the reference image for the corresponding selected locations in the measurement image through using each of the components of the measurement object image distances to select a deviation error from a corresponding deviation curve.

14. The method of claim 13 wherein a measurement object image distance is determined for every black pixel in the measurement object image.

15. The method of claim 13 wherein the coordinate system used has the two coordinate reference axes positioned perpendicular to one another.

16. The method of claim 13 wherein combining the deviation errors with the corresponding measurement object image distances for each of the selected locations further comprises combining the deviation error in each of the components of measurement object image distances along those two perpendicular coordinate reference axes for each of the selected locations in the measurement image with that component of measurement object image distances to form corrected components of measurement object image distances along those two coordinate reference axes for each of the selected locations in the measurement image.

17. The method of claim 16 wherein a measurement object image distance is determined for every black pixel in the measurement object image.

18. The method of claim 16 wherein the coordinate system used has the two coordinate reference axes positioned perpendicular to one another.

19. The method of claim 16 wherein using the corrected measurement object image distances further comprises using the corrected components of measurement object image distances along those two coordinate reference axes for each of the selected locations in the measurement image to determine distances between chosen pairs of those selected locations.

20. The method of claim 19 wherein a measurement object image distance is determined for every black pixel in the measurement object image.

21. The method of claim 19 wherein the coordinate system used has the two coordinate reference axes positioned perpendicular to one another.

* * * * *